United States Patent Office 3,202,669
Patented Aug. 24, 1965

3,202,669
6 - METHOXY - 1 - (3,4,5 - TRIMETHOXY PHENYL)-
9H - PYRIDO[3,4-b]INDOLE AND ITS ACID ADDI-
TION SALTS
Jackson B. Hester, Jr., Portage Township, Kalamazoo
County, and Jacob Szmuszkovicz, Kalamazoo, Mich.,
assignors to The Upjohn Company, Kalamazoo, Mich.,
a corporation of Delaware
No Drawing. Filed Nov. 6, 1963, Ser. No. 321,663
3 Claims. (Cl. 260—296)

This invention relates to a novel indole derivative and acid addition salts thereof.

The compounds of this invention include 6-methoxy-1-(3,4,5-trimethoxyphenyl)-9H-pyrido[3,4-b]indole of the formula

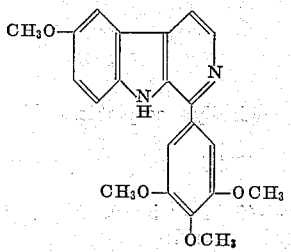

and the physiologically acceptable acid addition salts thereof, such as the hydrochloride, hydrobromide, acetate, pyruvate, sulfate, phosphate, citrate, tartrate, salicylate, lactate, succinate, benzoate, nitrate, p-toluenesulfonate and the like.

The 9H-pyrido[3,4-b]indole products and intermediate hereof are named in accord with the basic structure having positions numbered as follows:

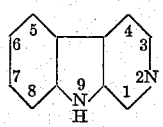

The compounds of this invention demonstrate significant depressant activity and can be administered to humans and animals as the primary active ingredients of conventional pharmaceutical forms such as tablets, capsules, elixirs, injectable solutions and suspensions and the like for tranquilization. Additionally, the free base forms a salt with fluosilicic acid which is useful as a mothproofing agent in accord with U.S. Patents 1,915,334 and 2,075,359. The free base also forms a salt with thiocyanic acid which condenses with formaldehyde to form resinous materials useful as pickling inhibitors according to U.S. Patents 2,425,320 and 2,606,155.

In preparing the products of this invention the known 5-methoxytryptamine is reacted with 3,4,5-trimethoxybenzoyl chloride to give N-[2-(5-methoxyindol-3-yl)ethyl]-3,4,5-trimethoxybenzamide, which is then cyclized in the presence of phosphorus pentoxide to produce 3,4-dihydro - 6 - methoxy-1-(3,4,5-trimethoxyphenyl)-9H-pyrido[3,4-b]indole, which is conveniently isolated and purified as the hydrochloride. Neutralization of the hydrochloride in the usual manner gives the free base. Dehydrogenation of the free base at elevated temperature in the presence of palladium catalyst produces the desired 6-methoxy-1-(3,4,5-trimethoxyphenyl)-9H-pyrido-[3,4-b]indole, which is conveniently isolated and purified as the hydrochloride. Neutralization of the hydrochloride as before gives the desired free base. Conventional treatment of the free bases with the appropriate acid, such as hydrochloric, hydrobromic, acetic and the like produces the corresponding acid addition salt as alluded to above. Purification of all products is by conventional methods.

The following preparations and examples illustrate the synthesis of representative products of this invention but are not to be construed as limiting the scope thereof.

PREPARATION 1

N-[2-(5-methoxyindol-3-yl)ethyl]-3,4,5-trimethoxybenzamide

A solution of 20.0 g. (0.087 mole) of 3,4,5-trimethoxybenzoyl chloride in 100 ml. of dry benzene was added under nitrogen with stirring to a solution of 15.0 g. (0.079 mole) of 5-methoxytryptamine in 150 ml. of dry benzene. The mixture was kept at 75–80° C. for 2 hours, during which time 7.1 g. of calcium oxide was slowly added. The cooled reaction mixture was poured onto crushed ice and the organic material was extracted with methylene chloride. The methylene chloride extracts were washed successively with water, dilute hydrochloric acid, water and saturated sodium chloride, dried over anhydrous sodium sulfate and concentrated to yield an oil which crystallized from ethyl acetate. The yield of the benzamide was 22.41 g. (74%), M.P. 134.5–138° C. An analytical sample, M.P. 136–138° C., was prepared by recrystallizing the amide from ethyl acetate. The ultraviolet spectrum (ethanol) had λ max. 264 mμ (ε 14,000) and inflections at 228, 296 and 308 mμ (ε 29,800, 7,200 and 3,950, respectively). The infrared spectrum (mineral oil mull) showed:

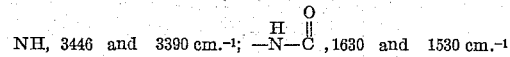

Analysis.—Calcd. for $C_{21}H_{24}N_2O_5$: C, 65.61; H, 6.29; N, 7.29. Found: C, 65.51; H, 6.22; N, 7.28.

PREPARATION 2

3,4-dihydro-6-methoxy-1-(3,4,5-trimethoxyphenyl)-9H-pyrido[3,4-b]indole

A solution of 5.10 g. (0.013 mole) of the amide from Preparation 1, in 50 ml. of dry xylene, was treated with 20 g. of phosphorus pentoxide. After the mixture had refluxed for 30 minutes, 5 g. of phosphorus pentoxide was added. The resulting mixture was allowed to reflux for 1.5 hours and was then poured into ice water. This mixture was made ammoniacal and extracted with methylene chloride. The methylene chloride extracts were dried over anhydrous sodium sulfate and concentrated in vacuo to yield a dark residue which was dissolved in ethanol and acidified with concentrated hydrochloric acid. Crystallization of the resulting hydrochloride yielded 3.44 g. (64%) of the product hydrochloride, M.P. 257° C. (dec.). An analytical sample, M.P. 256–258° C. (dec.), was prepared by recrystallizing the hydrochloride from ethanol-methylene chloride. The ultraviolet spectrum (ethanol) had λ max. 207 and 394 mμ (ε 48,950 and 19,350 respectively) and inflections at 268 and 340 mμ (ε 5,300 and 10,300, respectively).

Analysis.—Calcd. for $C_{21}H_{23}ClN_2O_4$: C, 62.77; H, 5.75; N, 6.96. Found: C, 62.73; H, 5.90; N, 7.04.

The free base was prepared by suspending the hydrochloride in methylene chloride and stirring the mixture with dilute ammonium hydroxide. The resulting methylene chloride solution was dried over anhydrous sodium sulfate, concentrated in vacuo and the base crystallized from ethyl acetate, M.P. 209–210° C.

EXAMPLE 1

6-methoxy-1-(3,4,5-trimethoxyphenyl)-9H-pyrido
[3,4-b]indole hydrochloride

A mixture of 3.60 g. (0.01 mole) of the 3,4-dihydro free base from Preparation 2, 2 g. of 10% palladium-on-carbon catalyst and 50 ml. of dry decahydronaphthalene was allowed to reflux under nitrogen with stirring for 1.5 hours. Ether was then added to the cooled reaction mixture, the catalyst was removed by filtration and the product was extracted from the ether solution with dilute acetic acid. The aqueous extract was made ammoniacal and extracted with methylene chloride. The methylene chloride extract was dried over sodium sulfate and concentrated in vacuo to yield a brown oil which was dissolved in ethanol and treated with ethanolic hydrogen chloride. The product quickly crystallized to yield 3.05 g. (77.7%) of the product hydrochloride, M.P. 290–291° C. (dec.). A small second crop, 121.7 mg., M.P. 286–287° C. (dec.) was obtained by concentrating the mother liquors. A sample of the hydrochloride was recrystallized from ethanol for analysis, M.P. 287° C. (dec.). The ultraviolet spectrum (ethanol) had λ max. 213, 254, 278, 303, 333 and 410 mμ (ε 49,650, 15,950, 17,700, 18,000, 11,800 and 3,000, respectively) and inflections at 236, 272 and 376 mμ (ε 27,250, 17,550 and 5,500, respectively).

*Analysis.*—Calcd. for $C_{21}H_{21}ClN_2O_4$: C, 62.92; H, 5.28; N, 6.99; Cl, 8.85. Found: C, 62.95; H, 5.09; N, 6.88; Cl, 9.09.

EXAMPLE 2

*6-methoxy-1-(3,4,5-trimethoxyphenyl)-9H-pyrido [3,4-b]indole*

Suspending the hydrochloride product of Example 1 above in methylene chloride and stirring with dilute ammonium hydroxide gives a methylene chloride solution yielding, on drying over anhydrous sodium sulfate and concentrating in vacuo, the desired free base, 6-methoxy-1-(3,4,5-trimethoxyphenyl)-9H-pyrido[3,4-b]indole.

Conventional treatment of the above free base with an acid such as hydrochloric, hydrobromic, acetic, pyruvic, sulfuric, phosphoric, citric, tartaric, salicylic, lactic, succinic, benzoic, nitric, p-toluenesulfonic and the like, followed by purification in the usual manner, gives the corresponding acid addition salt.

What is claimed is:

1. A compound selected from the group consisting of (1) 6-methoxy-1-(3,4,5-trimethoxyphenyl)-9H-pyrido[3,4-b]indole of the formula

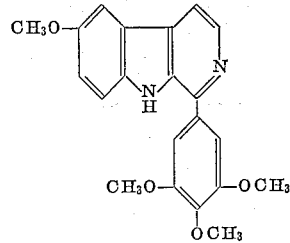

and (2) physiologically acceptable acid addition salts thereof.

2. 6-methoxy-1-(3,4,5 - trimethoxyphenyl)-9H-pyrido-[3,4-b]indole.

3. 6-methoxy-1-(3,4,5 - trimethoxylphenyl)-9H-pyrido-[3,4-b]indole hydrochloride.

No references cited.

WALTER A. MODANCE, *Primary Examiner.*